(12) United States Patent
Johnson

(10) Patent No.: US 7,795,830 B2
(45) Date of Patent: Sep. 14, 2010

(54) ELECTRIC MOTOR

(75) Inventor: Michael Frederick Johnson, Randburg (ZA)

(73) Assignee: Elckon Limited (GB)

( * ) Notice: Subject to any disclaimer, the term of this patent is extended or adjusted under 35 U.S.C. 154(b) by 239 days.

(21) Appl. No.: 11/988,221

(22) PCT Filed: Jul. 6, 2005

(86) PCT No.: PCT/GB2005/002673

§ 371 (c)(1),
(2), (4) Date: Mar. 19, 2008

(87) PCT Pub. No.: WO2007/003868

PCT Pub. Date: Jan. 11, 2007

(65) Prior Publication Data

US 2009/0179604 A1    Jul. 16, 2009

(51) Int. Cl.
*H02P 7/00* (2006.01)
(52) U.S. Cl. .................... 318/432; 318/400.26
(58) Field of Classification Search .......... 318/432, 318/434, 400.26, 400.38, 400.41
See application file for complete search history.

(56) References Cited

U.S. PATENT DOCUMENTS 3,749,991 A * 7/1973 Kuniyoshi ............ 318/400.02
5,359,272 A * 10/1994 Liao ..................... 318/732
6,646,406 B1 * 11/2003 Pollock et al. ........... 318/599

OTHER PUBLICATIONS

Sakutaro Nonaka et al. "Novel PWM-VSI Fed Brushless Three-Phase Synchornous Motor" Conference Record of the Industry Appls Society, Oct. 2-7, 1988, NY, IEEE, US vol. 1, Conf 23.
Oyama J et al. "Principle and Characteristics of a New Type AC Servo Motor Varifield" Drives 2 Brighton, Sep. 13-16, 1993, Proceedings of European Conference, London, IEE, GB.
Oyama J. et al. "Sensor-less Control of a Half-wave rectified Brushless Synchronous Motor" Industry appls conference 1995 13th IAS, Orlando, FL.
Nonaka S et al. "Analysis of Voltage-Adjustable Brushless Synchronous Generator Without Exciter" IEEE Transactions of Industry Appls USA, vol. 25, No. 1 , Jan. 1999.

* cited by examiner

*Primary Examiner*—Rina I Duda
(74) *Attorney, Agent, or Firm*—Carmen Patti Law Group, LLC

(57) ABSTRACT

An electric motor (10) which includes an armature (11) with at least two armature phase pair windings (12) and salient pole rotor arrangement (15) having field windings (17) terminating in a selective electrical switch which determines the electrical continuity of said field windings (17). Also included is control means which is configured to regulate the magnetizing of the field winding (17) so that, at any given moment, one armature phase pair is usable for magnetizing the field winding while the other pair is responsible for torque production.

11 Claims, 5 Drawing Sheets

ELECTRIC MOTOR

FIELD OF THE INVENTION

This invention relates to an electric motor.

BACKGROUND TO THE INVENTION

A synchronous motor has inherent advantages over induction and DC motors. In a synchronous motor, the speed of the rotor is exactly proportional to the frequency of the system which supplies the synchronous motor with electrical power. Accordingly, the synchronous motor is further characterized by the fact that it runs at a constant speed (for constant supply frequency) at leading power factor and has low starting current. The efficiency of such a motor is generally higher than for other electric motor types.

An armature of a synchronous motor is generally built with one set of AC poly-phase distributed windings, usually on the stator or outer annular ring of the motor. As such, the field winding of the motor is usually found on the rotor, and typically consists of more than one pole pair. It is generally understood that the field poles are excited with direct current. The configuration and method of exciting the rotor field windings determines the type of synchronous motor. In general, a separate exciter, slip rings, and brushes are required.

The exciter, slip rings and brushes are eliminated in the synchronous induction motor which has a rotor designed with differing reluctance paths across the air gap separating the stator and rotor to facilitate in developing reluctance torque. There are no field windings on the rotor, and hence no excitation source is required. The stator armature windings are then powered directly from an AC supply line.

The induction motor is simple and cheap to manufacture but does not offer the performance of the synchronous motor. On the other hand, slip-ring synchronous motors are more complex and expensive because of the exciter, slip rings and brushes required for operation. This also increases maintenance requirements, whereas the induction motor is virtually maintenance free. Brush DC motors have similar drawbacks although they are easier to control and have excellent traction characteristics. The slip rings and brushes are eliminated in brushless synchronous motors but the AC brushless exciter configuration still means additional cost, space and complexity.

Permanent magnet synchronous motors appear to be the most attractive. However, the manufacture and high cost of high field strength permanent magnets, and the process of attaching these magnets to the rotor, especially for large machines, becomes an engineering challenge. The maximum field strength of permanent magnets is also limited by the current state of the art. The synchronous induction motor, although very simple in construction, is not very efficient and is generally much larger than a slip-ring synchronous motor for similar performance. In practice, synchronous induction motors have not found much use above a few kilowatts.

SUMMARY OF THE INVENTION

According to an aspect of the invention there is provided an electric motor which includes an armature having at least two armature windings arranged to form two respective armature phases;

a salient pole rotor arrangement within the armature which rotor is separated from the armature by an air gap, said rotor being shaped and configured so that the salient pole arrangement defines a higher and a lower magnetic reluctance path through said gap between the rotor and armature, and which rotor further includes field windings about the salient poles of the rotor which windings are configured to form at least one pole pair, said field windings terminating in a selective electrical switch which determines the electrical continuity of said field windings so that a reverse voltage bias imposed across the switch results in the field winding being open circuit; and control means which is configured to regulate the magnetizing of the field winding by applying a voltage to the armature phase linked to the field winding via the lower reluctance path so that the energized armature phase in turn imposes a reverse voltage bias across the switch through induction, this reverse bias preventing the flow of current in the field winding but the applied voltage to the armature phase increasing magnetic flux density in the rotor, the control means thereafter removing said applied voltage once a predetermined flux density in the rotor is reached so that the removal of applied voltage induces a reversal of voltage to a forward voltage bias across the switch allowing current to flow in the field winding which current prevents the decay of the flux density in said rotor, and which control means is further configured to regulate the production of torque in the motor by applying a voltage to the other respective armature phase not responsible for energizing the field winding, so that, at any given moment, one armature phase is usable for magnetizing the field winding whilst the other phase is responsible for torque production.

It is to be appreciated that the selective switch in the field winding improves the efficiency of the motor by effectively capturing the magnetic flux density in the rotor when current is allowed to flow in the field winding. This no longer requires the armature winding to supply magnetizing current continuously as well as torque current, as is the case with, for example, existing induction motors.

It is further to be appreciated that the motor employs a switched mode flyback principle in order to magnetize the rotor.

The armature may include a plurality of packed slotted metal laminations to reduce eddy-currents in the armature. The rotor may include a plurality of packed slotted metal laminations to reduce eddy-currents in the rotor.

The selective switch may include a freewheeling diode. The selective switch may include a solid-state device, e.g. a transistor, a thyristor, or the like.

The control means may include a microprocessor. The control means may include electronic switches for controlling the energizing of the armature phases. The electronic switches may include transistors. Accordingly, the electronic switches may be arranged in an H-bridge arrangement.

The control means may include sensors for sensing the position of the rotor relative to the armature phases so as to regulate the energizing of the phases at the correct instances.

The control means may be configured to determine the position of the rotor from armature phase current and voltage characteristics.

The control means may regulate the flux density in the rotor depending on the speed of the motor, e.g. at high speed the magnetization of the field winding need only be topped up every few revolutions of the rotor, whereas at low speed the field winding may require topping up multiple times during one revolution of the rotor.

The control means may be configured to control the motor as a generator under suitable circumstances.

An armature phase may be dedicated to magnetizing the field winding. Accordingly, an armature phase may be dedicated to torque production in the motor.

BRIEF DESCRIPTION OF THE DRAWINGS

The invention is now described, by way of non-limiting example, with reference to the accompanying drawings wherein.

DETAILED DESCRIPTION OF THE INVENTION

Figure 1:
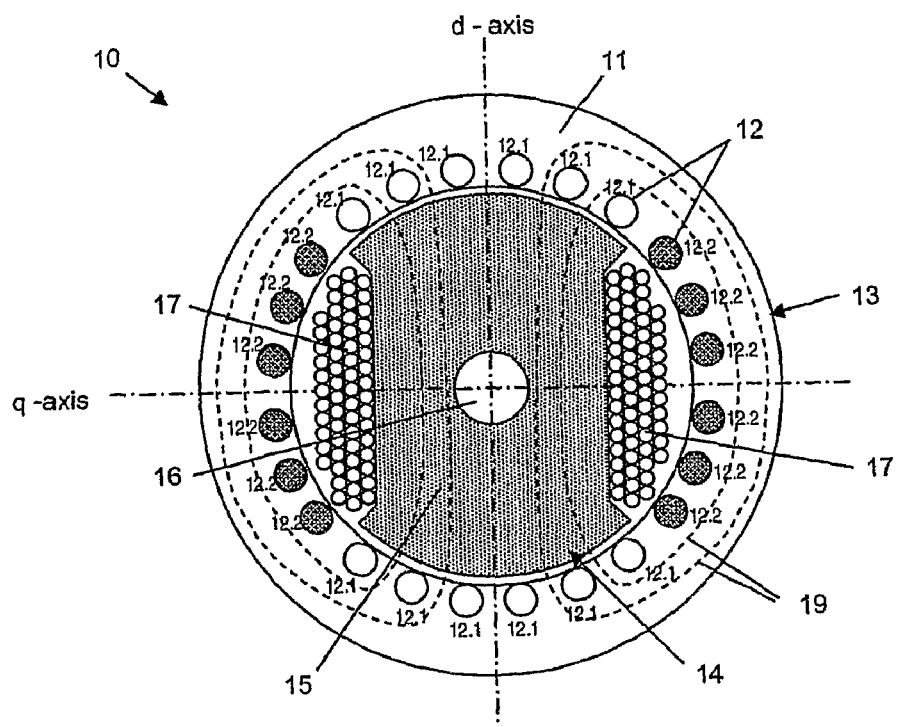
FIG. 1 shows, in radial cross-sectional view, an electric motor, in accordance with the invention.

With reference to the accompanying drawings, an electric motor, in accordance with the invention, is generally indicated by reference numeral 10.

Figure 2:
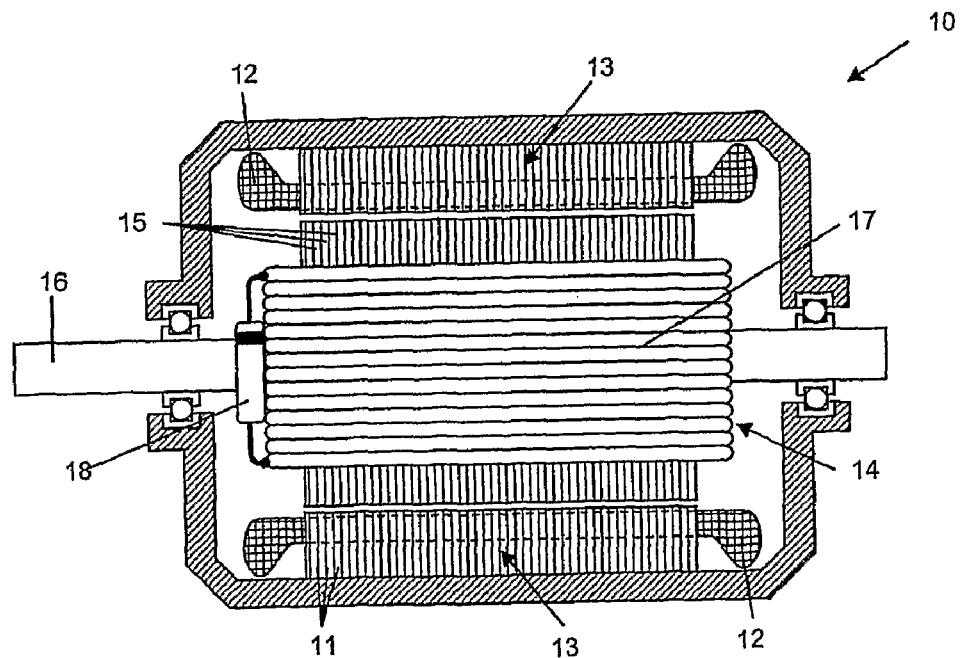
FIG. 2 shows, in axial cross-sectional view, the electric motor of FIG. 1.

Referring to FIGS. 1 and 2, the outer member of the motor 10 consists of packed slotted steel laminations 11 for holding the armature windings 12, which together constitute the stator 13. The armature windings 12 are further divided into two separate windings 12.1 and 12.2 constituting two separate phases.

Similarly, the inner member consists of packed steel laminations 15 relatively fixed to a drive shaft 16 with a field winding 17 terminating in the selective switch being a freewheeling diode or rectifier 18 in this embodiment which collectively constitute the rotor 14 being able to rotate relative to the stator 13.

It is to be appreciated that, for the purposes of explanation, a reference coordinate system d-q is shown on FIG. 1. This coordinate system is rotatively associated or referenced to the rotor 14. Regarding the salient pole arrangement of the rotor 14, the air gap in the direct axis d is much smaller than the air gap in the quadrature axis q.

The reluctance of the magnetic circuit along the q axis is thus much greater than the reluctance along the d axis. This is an important feature of the invention and is integral to its mode of operation. The higher reluctance in the q axis reduces the magnetic coupling of the torque producing armature phase with the rotor 14, which is desirable. The larger air gap along the q axis also provides space for the field winding 17 resulting in the salient pole structure.

It is to be appreciated that the invention generally requires the rotor 14 to be of a salient pole nature. The shape of the laminations 15 are similar to that of a reluctance motor (not shown), but the motor 10 does not operate on reluctance torque; the action of the field winding 17 and diode 18 combination are directly involved in the production of torque.

In the embodiment shown, the rotor 14 has one pole pair, but in other embodiments, the rotor may be constructed with multiple pole pairs. Similarly, the stator 13 may be constructed with more than two phases in further embodiments.

Referring now to the position of the rotor 14 relative to the armature phase windings 12.1 and 12.2 in FIG. 1. One novel aspect of the invention is the method by which the rotor 14 pole pair is magnetized, i.e. the method by which the field winding 17 is excited. Ignoring the action of the field winding 17 for the moment; current applied to the armature phase 12.1 will produce a magnetic field in the direction of the q axis. Similarly, current applied to the armature phase 12.2 will produce a magnetic field in the direction of the d axis. The magnetic field in the d axis will be many times larger than that in the q axis due to the much larger reluctance in the q axis.

In operation, either stationary or rotating, by correct timing and switching of the armature phases 12.1 and 12.2 the magnetic field excitation of the rotor 14 will be kept at a maximum along the d axis and a minimum along the q axis (essentially zero).

When the armature phase winding 12.1 or 12.2 centre axis is aligned with the rotor 14 direct axis d, then the particular armature winding is strongly coupled to the field winding 17. Similarly, when the armature phase winding 12.1 or 12.2 centre axis is aligned with the rotor 14 quadrature axis q, then the particular armature winding is weakly coupled to the field winding 17.

Figure 3:
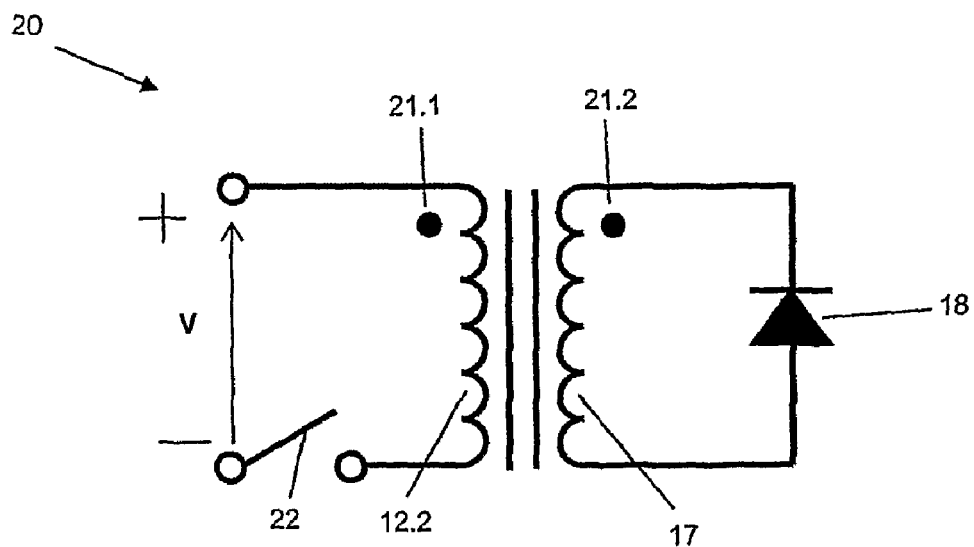
FIG. 3 shows, in schematic view, a circuit diagram representing an armature phase interaction with the field winding through the lower magnetic reluctance path.

FIG. 3 shows a schematic of a transformer representation 20 of the armature winding 12.2 strongly coupled to the field winding 17 terminated in the diode 18. The armature winding 12.2 serves as the primary of the transformer 20, and the field winding 17 serves as the secondary of the transformer 20. It is to be appreciated that the transformer representation 20 is only valid when the centre axis of the armature phase winding 12.2 is aligned with the rotor direct axis d, i.e. strongly coupled. When the armature winding 12.2 is in quadrature to the field winding 17, there is no transformer action due to the respective windings' central axis being perpendicular to one another.

As is convention, the black dots 21.1 and 21.2 indicate the "same" polarity of the respective windings. There are two positions of the rotor 14 in one full cycle of rotation when the armature phase 12.2 centre axis aligns with the rotor d axis.

In a first position, with the switch 22 closed so that positive voltage is applied to the primary 12.2, the diode 18 will be reverse biased as shown in FIG. 3. In a second position, the rotor 14 being 180° rotated with positive voltage applied to the primary 12.2, the diode 18 will be forward biased (not shown).

Considering the first position, the switch 22 is closed thus applying a positive voltage to the primary winding 12.2. A voltage is induced in the secondary 17 which applies a reverse bias to the diode 18 preventing current from flowing in the secondary winding 17. However, the magnetizing current in the primary winding 12.2 and, hence, the magnetic flux density in the rotor laminations 15 will increase or ramp up from zero, according to:

$$v = L \cdot di/dt \qquad (1)$$

$$di = dt \cdot v/L \qquad (2)$$

where:
  v is the applied voltage in volts (V)
  L is the primary inductance in Henrys (H)
  di is the change in current in amps (A)
  dt is the change in time in seconds (s)

The switch 22 is opened when the magnetic flux density reaches the predetermined or desired value. This interrupts the primary current which must decrease to zero—the rate of change of the current di/dt is therefore negative and from equation (1) the voltage across the primary winding becomes negative.

Accordingly, the secondary winding 17 also experiences a voltage reversal through induction, causing the diode 18 to become forward biased and conducting. The current thus caused to flow in the secondary winding 17 will be proportional to the magnetic flux density created in the core laminations 15 by the primary winding 12.2 in the first place. The current in the rotor field windings 17 effectively captures the magnetic flux density in the core laminations 15.

It is to be appreciated that the voltage impressed across the secondary winding 17 by the diode 18 forward voltage is much lower than the voltage initially applied across the primary 12.2. From equation (1), this means that the decay rate of the secondary 17 current di/dt and hence the decay of the magnetic flux density is much slower than the ramp rate of the primary 12.2 current, and hence the ramp rate of the magnetic flux density.

As such, the decay time of the field magnetization can be designed to be orders of magnitude longer than the ramp time by the correct choice of applied voltage, and primary to secondary turns ratio. For example, a typical applied voltage may be 300 V and diode forward voltage may be 1V, and accounting for the turns ratio, once the rotor field is at maximum magnetization it only needs to be charged for 50 us every 15 ms, say, to maintain the field strength within 10% of its maximum.

Considering now then only the magnetization of the rotor 14 of FIG. 1 (and not torque production) with the rotor 14 rotating at speed relative to the stator 13. The control means or power-drive-electronics (not shown) briefly applies the correct polarity voltage to the particular armature phase 12.1 or 12.2 whenever the rotor 14 direct axis d (with the correct polarity of diode, 18) aligns momentarily with, in passing, the phase 12.1 or 12.2 centre axis to give the rotor 14 a magnetic "charge".

At start up, the magnetic "charge" time will be ten times longer, say, than the running top up "charge" time, in order to get the rotor 14 magnetic field up to its maximum value initially. When running at high speed the rotor 14 magnetization may only need topping up every few cycles whereas at very low speed it may need topping up a few times per cycle.

In a preferred embodiment of the invention, a diode 18 is used as the switching element in the rotor winding 17. It is however to be appreciated that any type of switching element that is suitably synchronized to the switching of the armature phase windings 12.1 and 12.2 may be used, e.g. transistor, thyristor, MOSFETs, and/or the like.

A person skilled in the art will appreciate that a similar principle to that described above is employed in the operation of a flyback transformer in a switched mode power supply. However, in the flyback transformer, energy is continuously transferred from the primary winding to a fixed secondary winding connected to a resistive load, whereas in the motor 10 the flyback principle is used to maintain the magnetic flux density in a relative, rotating rotor.

Let us now consider torque production in the motor 10. The force exerted on a current carrying conductor in and perpendicular to a magnetic field is given by the Lorentz force equation:

$$F = I \cdot i \cdot B \quad (3)$$

Where:
F is the force in Newtons, N.
I is the conductor length in metres, m.
i is the current in the conductor in amps, A.
B is the magnetic flux density in Tesla, T.

And the torque in a motor would be given by;

$$\begin{aligned} T &= F \cdot r & \text{(From (3))} \\ &= l \cdot i \cdot B \cdot r & (4) \end{aligned}$$

Where:
r is the rotor radius.
T is the torque in N·m.
F is the force in Newtons, N.

Referring to FIG. 1, assume that the rotor 14 is fully magnetized. The magnetic flux lines 19 passing azimuthally through the stator core 13 do not cross the conductors of the armature phase 12.2 and hence these conductors experience no force. The conductors of armature phase 12.1 however, are perpendicular to, and lie directly in, the magnetic flux lines 19 crossing from the stator 15 to the rotor 14 across the air gap and thus experience a torque according to equation (4).

Since the conductors of the armature phase winding 12.1 are fixed in the stator 13 and since the rotor 14 in turn experiences an opposite reaction, the rotor 14 will experience the resultant torque and motion. Thus torque is produced in the rotor 14 by current flowing in the stator conductors 12.1 or 12.2 that are located in the smaller, or d axis, air gap.

In operation, both the armature phases 12.1 and 12.2 will alternately produce torque and magnetizing charge as the motor rotates. The torque producing current will be applied for a large portion of the rotor cycle whereas magnetization will be a fraction of the time. Microprocessor controlled power transistors, with suitable position detection of the rotor 14, and armature phase current feedback, can accomplish the required timing and current control between the phases.

The angular position of the rotor 14 can be determined directly through sensing elements mounted on the rotor 14 and feedback circuits. Otherwise, the position can be indirectly determined from the voltage and current characteristics of the armature windings since these are affected by the variable reluctance presented by the rotor 14 dependent on its angular position (due to the difference in air gap in the direct and quadrature axis).

Figure 4:
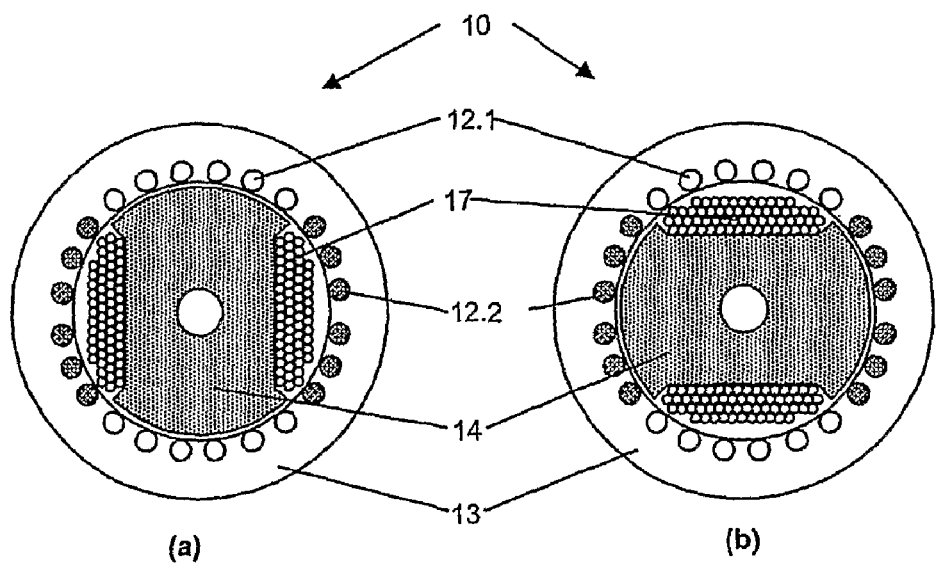
FIGS. 4a and 4b show, in radial cross-sectional view, the rotor of the motor in different positions relative to the armature.

In other words, in a first rotor position shown in FIG. 4a, armature phase winding 12.1 produces torque when carrying current while at the same time armature phase winding 12.2 charges up the magnetic field in the rotor 14. Similarly, in a second rotor position shown in FIG. 4b, the roles are reversed and armature phase winding 12.2 produces torque while armature phase winding 12.1 charges up the magnetic field in the rotor 14.

Figure 5:
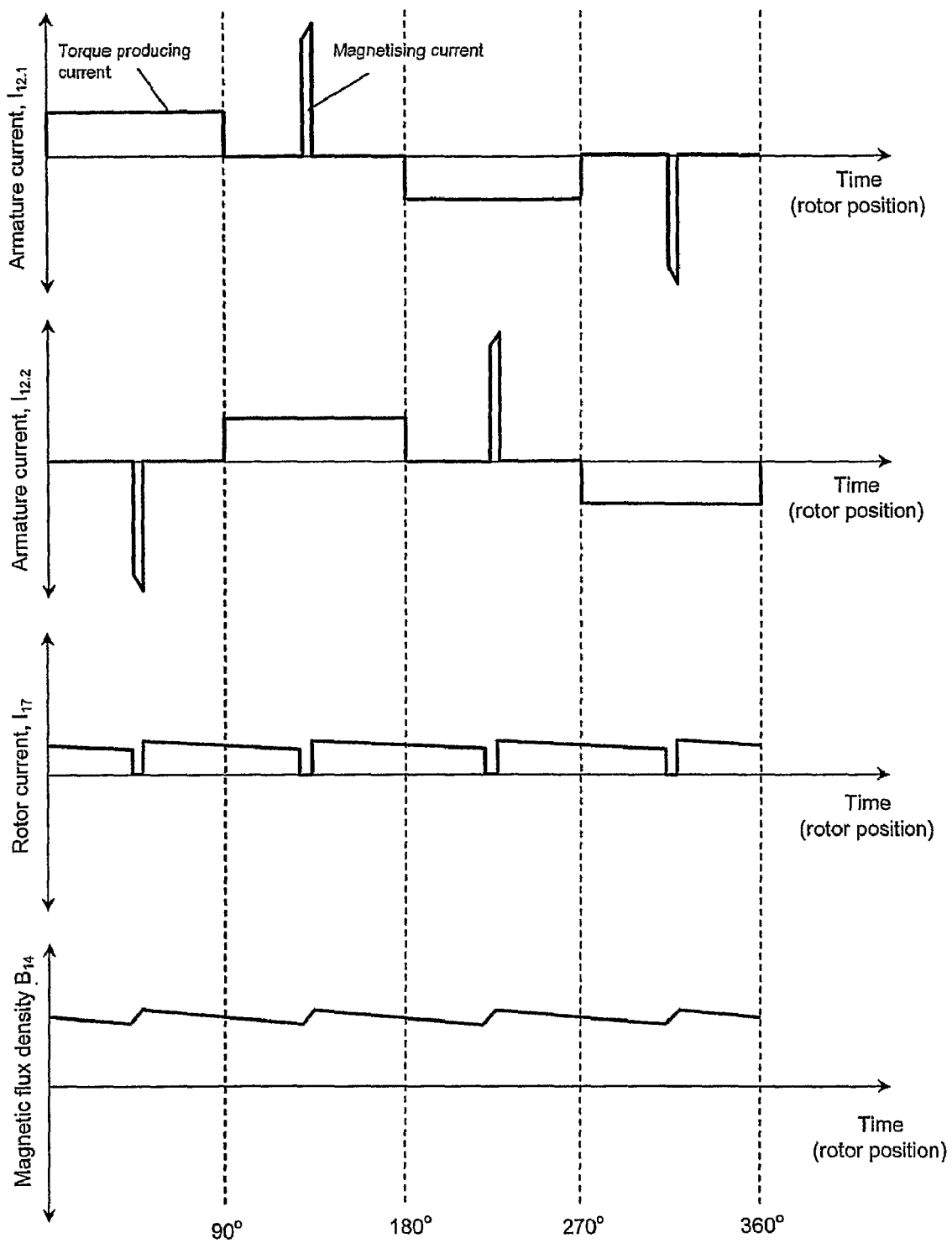
FIG. 5 shows graphs of the current and flux density of the different field and armature windings during operation of the motor shown in FIG. 1.

Graphs showing the currents $I_{12.1}$, $I_{12.2}$, and $I_{17}$ for the armature phase windings 12.1, 12.2, and the rotor field winding 17, respectively, and the rotor 14 magnetic flux density $B_{14}$ verses time over one full cycle of rotation are given in FIG. 5, for a particular direction of rotation. The armature phase current $I_{12.1}$ and $I_{12.2}$ waveforms consist of two torque producing segments and two magnetizing pulses in a full cycle, as indicated.

It is to be appreciated that the direction of rotation of the rotor 14 is easily reversed by changing the polarity of one of the armature phase currents, $I_{12.1}$ or $I_{12.2}$, or simply by swapping the timing sequence of $I_{12.1}$ and $I_{12.2}$.

The motor 10 will operate as a generator by reversing the polarity of the armature phase current $I_{12.1}$ and $I_{12.2}$ torque producing segments, but with the same timing and polarity of the magnetizing current pulse as they are shown in FIG. 5.

Whether motoring or generating, in forward or reverse direction, the timing of the currents are synchronized to the rotor 14 position.

Figure 6:
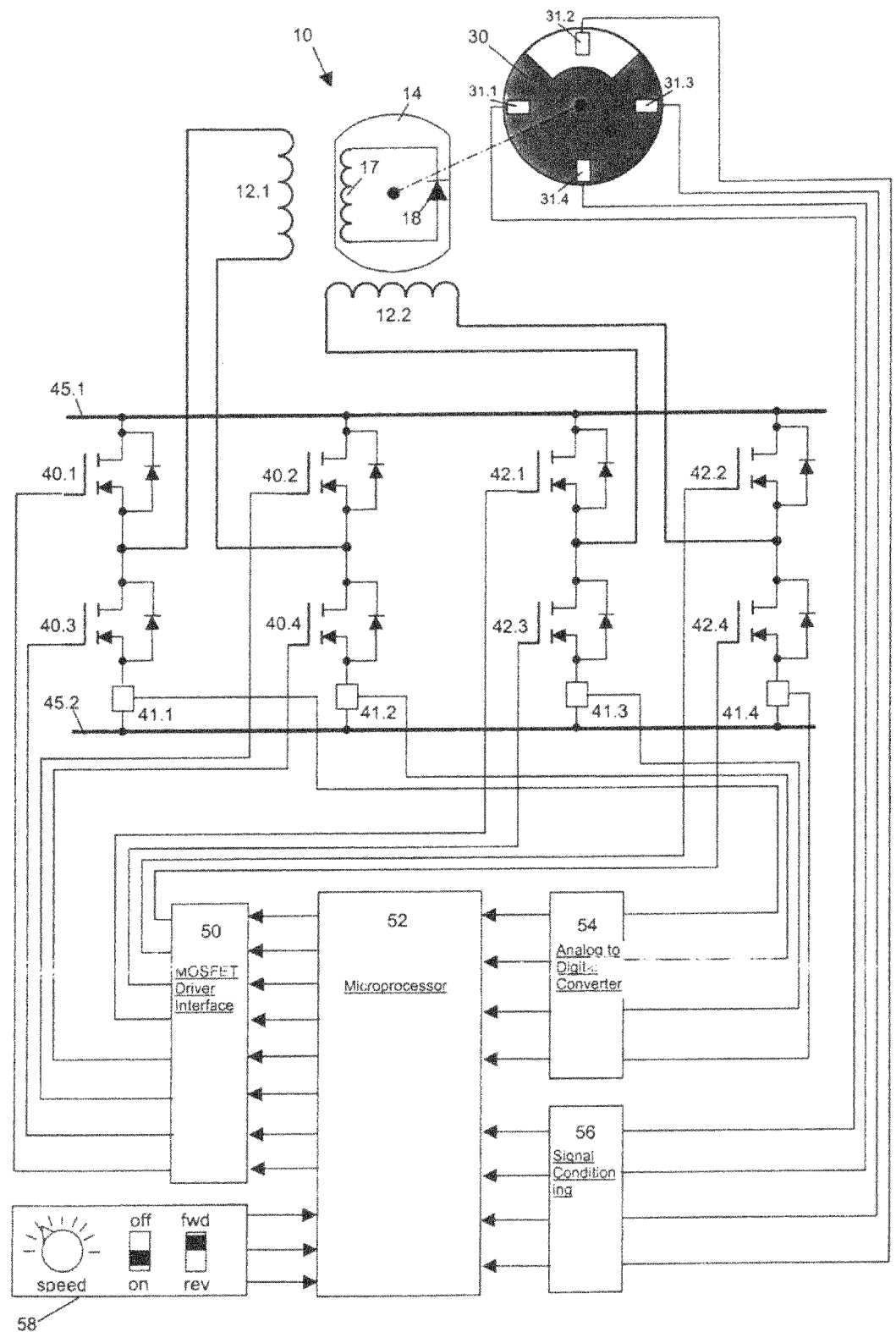
FIG. 6 shows, in schematic view, one embodiment of the control means.

An electronic circuit for the control means for driving the motor 10 is shown in FIG. 6. A schematic representation of the motor 10 is included showing the armature windings 12.1 and 12.2; the rotor 14, the rotor field winding 17, and the free wheeling diode 18.

In the embodiment shown, a DC power source (not shown) supplies the main DC bus 45.1 and 45.2 for the motor 10. An "H-bridge" arrangement of MOSFET transistors 40.1, 40.2, 40.3, 40.4 is used to switch the required current to the armature phase winding 12.1 and an "H-bridge" arrangement of MOSFET transistors 42.1, 42.2, 42.3, 42.4 is used to switch the required current to the armature phase winding 12.2.

This allows either phase to be independently controlled, for positive and negative current polarity and, through the employment of pulse width modulation, independent control of the current magnitudes.

A microprocessor 52 controls the switching of the MOSFETs via a MOSFET driver interface 50, and hence directly controls the timing, magnitude, and polarity of the currents $I_{12.1}$, $I_{12.2}$ and $I_{17}$. Current sensor elements 41.1, 41.2, 41.3, 41.4 provide feedback signals to the microprocessor 52, via an analog to digital converter 54, for current magnitude control.

The position of the rotor 14 relative to the stator 13 is required for the microprocessor to control the phase currents, $I_{12.1}$ and $I_{12.2}$ and rotor field current $I_{17}$, in magnitude and timing, according to FIG. 5. An example of a rotor position detecting means is shown by use of a disc 30 rotatively fixed to the rotor 14; and four optically reflective sensors 31.1, 31.2, 31.3, 31.4 fixed relative to the stator of the motor. The disc 30 has a 90° segment reflectively coloured (white) as shown, with the remaining 270° segment being non-reflective.

The signals from the optical sensors 31.1, 31.2, 31.3, 31.4 are returned to the microprocessor 52 via a buffer, or signal conditioning element 56. With the disc 30 positioned as shown with the white, reflective element under optical sensor 31.2, the signal returned by optical sensor 31.2 would be a digital "1" for example, and the signals returned by the remaining sensors 31.1, 31.3, 31.4 would be a digital "0". The microprocessor 52 thus controls the current applied to the armature phase windings 12.1 and 12.2 in accordance with FIG. 5 synchronized to the rotor 14 position, determined by the digital combinations returned by the optical sensors 31.

Other detection means may also be employed, such as magnetically coupled position detection, direct slide contact switches, commutator, or the like.

In a preferred embodiment, the microprocessor 52 monitors the state of switches and a variable resistor included in the user interface panel 58 to start, stop, or change direction of the motor. Upon starting the motor 10, the rotor 14 is initially completely unmagnetized, i.e. no current $I_{17}$ flows through the field winding 17 and free wheeling diode 18.

As such, the rotor 14 must first be fully magnetized or "charged" by whichever is strongly coupled of the armature windings 12.1 or 12.2 to the rotor field winding 17 (as per FIG. 3 and its corresponding description). The microprocessor 52 determines the orientation of the rotor 14 with respect to the armature windings 12.1 and 12.2 from the signals obtained from sensors 31 and selects the winding 12.1 or 12.2 which is strongly coupled to the rotor field 17 and determines the required current direction. The microprocessor 52 switches on the required MOSFET transistor pair from the two "H-bridges" 40 and 42 to charge up the magnetic flux density $B_{14}$ in the rotor 14 to the required value.

The rotor 14 remains stationary during this process. Once the magnetic flux density has reached the required value, the active or charging armature winding of 12.1 or 12.2 is switched off. The previously idle armature winding of 12.1 or 12.2 is then switched on to produce torque. If there is a reasonable or light load coupled to the motor 10 it will accelerate up to speed and the timing and control of currents will resemble those shown in FIG. 5. However if the load is too large for the motor 10, i.e. locked rotor 14, or a high inertia load, the first armature winding of 12.1 or 12.2 will have to keep topping up the rotor 14 magnetic flux density B14, while the second winding will have to keep supplying driving or torque current continuously until the rotor 14 begins turning whereupon the two armature windings 12.1 and 12.2 will begin alternately supplying torque current and magnetizing current according to the rotor 14 position.

Figure 7:
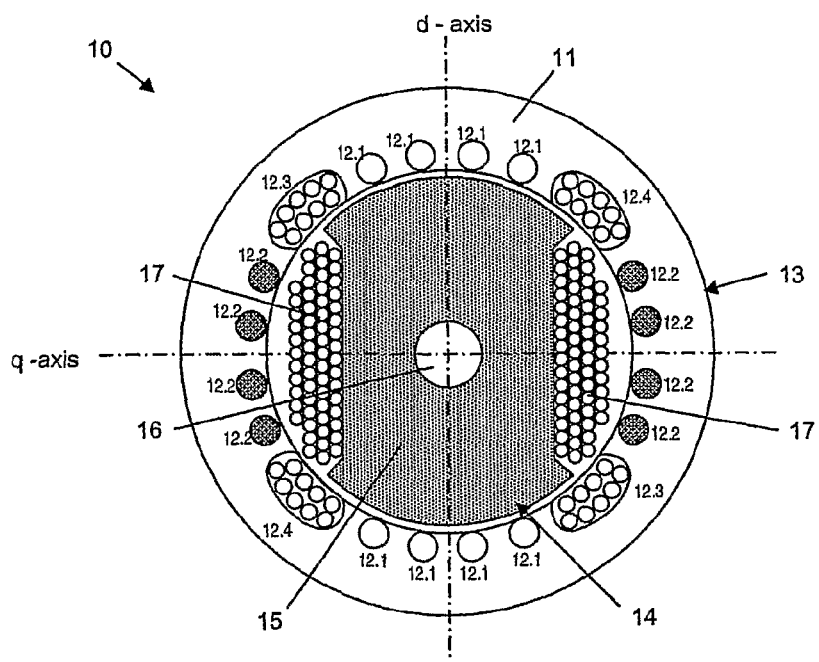
FIG. 7 shows, in radial cross-sectional view, a further embodiment of the motor.
Figure 8:
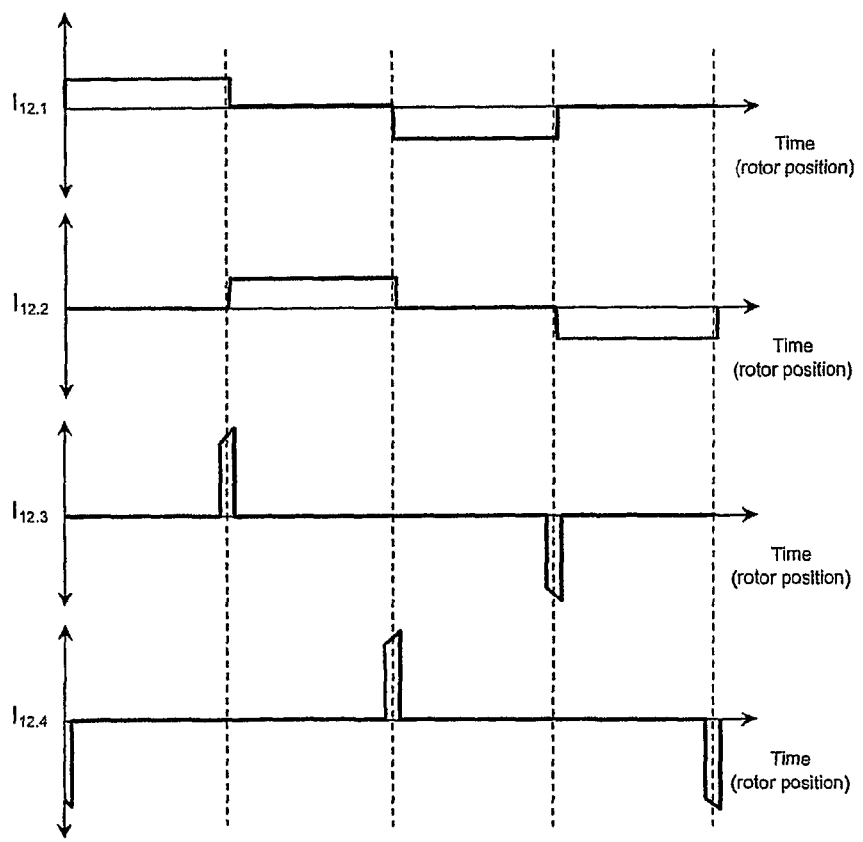
FIG. 8 shows graphs of the armature winding currents during operation of the motor shown in FIG. 7.

The above general description and mechanicals, windings and electronics are the preferred embodiment of the invention. A second embodiment could be implemented with armature windings 12.1 and 12.2 being always torque-producing windings, with additional windings 12.3 and 12.4 located in the stator being always magnetizing windings. A schematic of this embodiment is shown in FIG. 7, and the corresponding current graphs are shown in FIG. 8.

The graphs in FIG. 5 are an example of possible armature currents $I_{12.1}$ and $I_{12.2}$ wave-shapes and timing. The torque producing current portions are shown as constant values for a quarter of a cycle, or 900 of mechanical angle of the rotor 14, for simplicity. These wave-shapes may be modified to optimize torque and reduce harmonics e.g. stepped, sinusoidal, or the like.

The magnetizing current pulse portion of the armature currents $I_{12.1}$ and $I_{12.2}$ may have a much larger magnitude than the torque producing portion but the pulse width will be a hundred times, or more, narrower resulting in an average or RMS value of magnetizing current far less than the average or RMS value of torque current.

For example, the magnetizing pulse RMS value may be only 0.5 A for an RMS torque current value of 10 A. The magnetizing pulse current therefore produces very little heating losses in the stator windings 12 compared to the torque producing current. The major portion of magnetizing losses occurs in the rotor windings 17, since the rotor field winding current $I_{17}$ is very nearly continuous at a reasonable value.

It is to be appreciated that the maximum magnetization current in an induction motor is generally limited by the current carrying capacity of the stator windings and harmonic distortion of the sinusoidal magnetizing current when approaching magnetic saturation. The maximum magnetization of a permanent magnet motor is limited by the current state of the art concerning magnet production.

The motor 10 herein described does not suffer from these drawbacks and a much higher magnetization of the rotor and higher torque current is obtained, at comparable efficiencies, resulting in higher power density and torque for similar sized motors.

The overall efficiency of the motor 10 can be dynamically optimized by keeping the rotor 14's copper losses equal to the stator 13's copper losses. The microprocessor 52 can adjust the magnitudes of torque current and magnetizing current for optimum efficiency, over the full speed range and variable loading.

It shall be understood that the examples are provided for illustrating the invention further and to assist a person skilled in the art with understanding the invention and is not meant to be construed as unduly limiting the reasonable scope of the invention.

The Inventor regards it as an advantage that the motor has overall performance exceeding that of the synchronous motor, induction motor and brush or brushless DC motor, whilst incorporating the simplicity and cost effective manufacturability of the induction motor.

The Inventor regards it as a further advantage that the motor has a higher power density and efficiency compared with all other motor types. The Inventor regards it as a yet further advantage that the motor has high starting torque for low starting current which finds particular application in traction applications.

The Inventor also regards it as an advantage that dynamic speed and torque control at optimal efficiency over the full load range, with full four-quadrant operation (motoring, generating, forward and reverse), is simple to implement.

The invention claimed is:

1. An electric motor comprising:
    an armature having at least two armature windings arranged to form two respective armature phases;
    a salient pole rotor arrangement within the armature which rotor is separated from the armature by an air gap, said rotor being shaped and configured so that the salient pole arrangement defines a higher and a lower magnetic reluctance path through said gap between the rotor and armature, and which rotor further includes field windings about the salient poles of the rotor which windings are configured to form at least one pole pair, said field windings terminating in a selective electrical switch which determines the electrical continuity of said field windings so that a reverse voltage bias imposed across the switch results in the field winding being open circuit; and
    control means which is configured to regulate the magnetizing of the field winding by applying a voltage to the armature phase linked to the field winding via the lower reluctance path so that the energized armature phase in turn imposes a reverse voltage bias across the switch through induction, this reverse bias preventing the flow of current in the field winding but the applied voltage to the armature phase increasing magnetic flux density in the rotor, the control means thereafter removing said applied voltage once a predetermined flux density in the rotor is reached so that the removal of applied voltage induces a reversal of voltage to a forward voltage bias across the switch allowing current to flow in the field winding which current prevents the decay of the flux density in said rotor, and which control means is further configured to regulate the production of torque in the motor by applying a voltage to the other respective armature phase not responsible for energizing the field winding, so that, at any given moment, one armature phase is usable for magnetizing the field winding whilst the other phase is responsible for torque production.

2. A motor as claimed in claim 1, wherein the selective switch includes a freewheeling diode.

3. A motor as claimed in claims 1, wherein the selective switch includes a solid-state electronic device.

4. A motor as claimed in claim 1, wherein the control means includes a microprocessor.

5. A motor as claimed in claim 1, wherein the control means includes electronic switches for controlling the application of voltage to the armature phases.

6. A motor as claimed in claim 1, wherein the control means includes sensors for sensing the position of the rotor relative to the armature phases so as to regulate the application of voltage to the phases at the correct instances.

7. A motor as claimed in claim 1, wherein the control means is configured to determine the position of the rotor from armature phase current and voltage characteristics.

8. A motor as claimed in claim 1, wherein the control means regulates the magnetic flux density in the rotor depending on the speed of the motor.

9. A motor as claimed in claim 1, wherein the control means is configured to control the motor as a generator under suitable circumstances.

10. A motor as claimed in claim 1, wherein an armature phase is dedicated to magnetizing the field winding.

11. A motor as claimed in claim 1, wherein an armature phase is dedicated to torque production in the motor.

* * * * *